United States Patent
Hertl

[15] 3,635,071
[45] Jan. 18, 1972

[54] DRAIN VALVE FOR A HYDRAULIC SHOCK ABSORBER

[72] Inventor: Albert Hertl, Duisburg, Germany
[73] Assignee: Hydraulik G.m.b.H., Duisburg, Germany
[22] Filed: July 8, 1969
[21] Appl. No.: 839,814

[30] Foreign Application Priority Data
Sept. 21, 1968  Germany ..................P 17 77 196.9

[52] U.S. Cl. ...................................72/453, 100/53, 137/38
[51] Int. Cl. .........................................................B21j 9/20
[58] Field of Search ..................72/453; 100/53, 269; 137/38, 137/48, 47

[56] References Cited
UNITED STATES PATENTS

| | | | |
|---|---|---|---|
| 3,010,432 | 11/1961 | Robra | 100/269 R |
| 3,100,495 | 8/1963 | Boler | 137/38 |
| 3,124,091 | 3/1964 | Williamson | 72/453 |
| 3,205,749 | 9/1965 | Schenk | 100/269 R |
| 3,521,652 | 7/1970 | Reeks | 137/38 |

Primary Examiner—Charles W. Lanham
Assistant Examiner—Gene P. Crosby
Attorney—McGlew and Toren

[57] ABSTRACT

A drain valve for a hydraulic shock absorber particularly for use on a large hydraulic press, includes a drain passage carried on a plunger member which is moved downwardly with the movable machine element such as a guide plunger of a press crosshead. The passage defines a valve seat which is closed by a valve disc of relatively great mass under the action of a preset biasing spring. The mass of the valve disc is such that, during a shock movement of the crosshead and the supporting plunger therefor causing a fast movement of the plunger, the seat will move away from the valve disc mass because of the large mass movement of inertia of the disc, and permit flow through the drain valve passage. The plunger will gradually absorb the shock as the fluid in its associated cylinder is displaced out of the drain passage.

7 Claims, 2 Drawing Figures

PATENTED JAN 18 1972  3,635,071
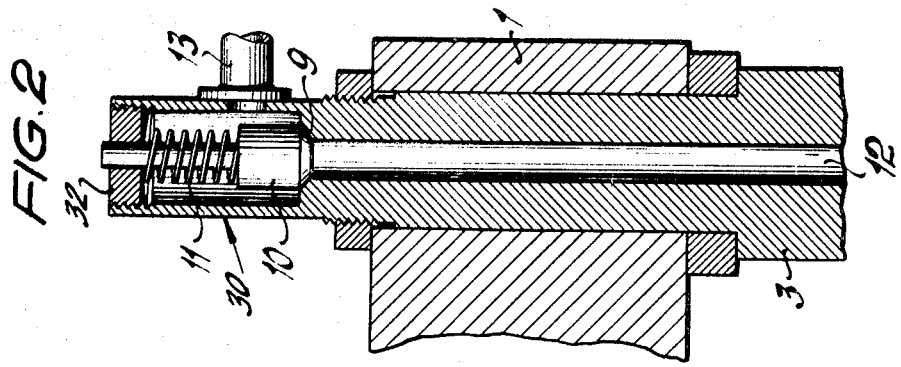
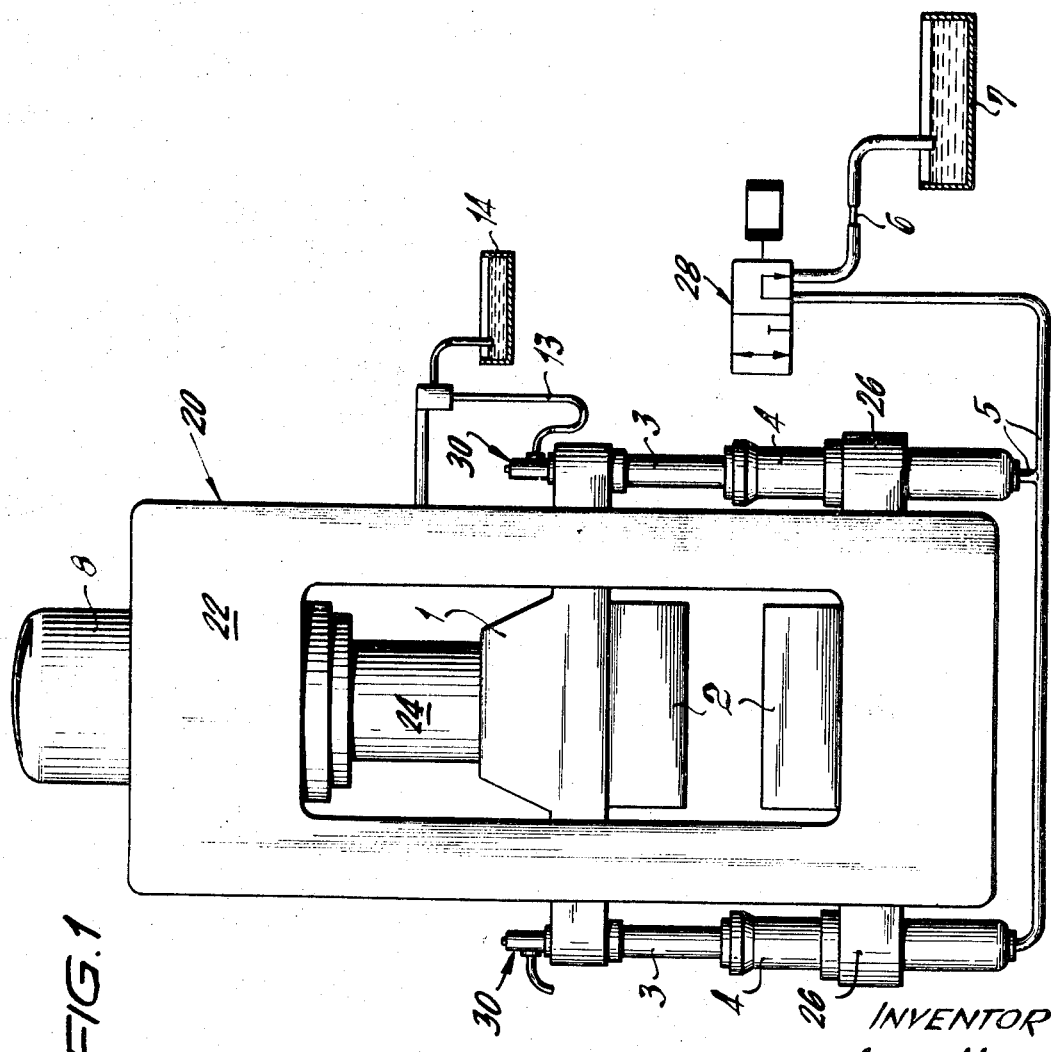
INVENTOR
Albert HERTL
BY
McGlew & Toren
ATTORNEYS

DRAIN VALVE FOR A HYDRAULIC SHOCK ABSORBER

SUMMARY OF THE INVENTION

This invention relates in general to the construction of hydraulic shock absorbers, and in particular, to a new and useful arrangement of a shock absorber for a large device such as a hydraulic press, and which includes a drain passage which is normally closed by a valve disc of large mass but which will open the passage to absorb shock forces when a rapid shock movement of the supported part takes place.

In the cold forming of a workpiece in a metallurgical plant, a sudden rupture of the workpiece may occur if the yield point of the material is exceeded. This may occur because the workpieces such as long-rolling plates which are stretched are acted upon in elastic deformation under different circumstances from time to time. This deformation energy is stored in the force-transmitting parts of the machine and during the rupture of the workpiece the holders undergo a high acceleration in the direction of the force which is exerted by them. Measures are therefore required for stopping the resulting movement of the tool holders so that there will not be any impact shock on the machine parts. This is particularly necessary for example, in the crosshead of a hydraulic press for the clamping head of a stretching machine. In modern large machines, the movable parts are supported on a foundation for example by resilient elements or hydraulic fluid cylinder shock absorbers. For example, a brake piston or plunger and cylinder-combination is connected to the crosshead of the movable part and the piston is displaced in its cylinder by the normal-working movement of the tool holder. During this normal-working movement the piston is displaced at relatively low speed and practically pressure free because of the arrangement of the hydraulic cylinder which includes a throttle element for absorbing the expected working stroke displacement. When the speed is increased because of the rupture of the workpiece the pressure rises in the fluid cylinder and the moving parts are braked abruptly. The increased pressure also opens an overpressure valve such as a drain valve of the shock absorber cylinder and this drain valve or shock valve limits the pressure in the cylinder to an adequate value.

In the case of rupture of the workpiece the pressure increase takes place in an extremely short time; and, because of the amount of energy released there is a danger that the drain valve will not open fast enough due to its unavoidable mass moment of inertia an inadmissible pressure peak will be formed in the brake cylinder which could lead to the destruction of the machine parts which transmit the braking pressure. It has been proposed to provide certain shock valve elements in the drain connections to the supporting cylinders to permit a displacement in the cylinder during the downward movement of the plunger connected to the movable machine part and in order to provide for a regulated discharge of the fluid. Such valves can be shut off or throttled and usually one throttle element is associated with each drain valve and drain discharge line. All of the known shock absorber constructions include throttle valves or shock valves having parts which react too slowly because too large a mass must be moved.

In accordance with the present invention, there is provided a drain valve for shock absorbers which opens rapidly is not subject to a delay due to an inertia of the part to be moved. Such a valve includes a valve seat at the end of a passage which is carried on a movable plunger which moves with the machine part which is being regulated. The valve seat is closed by a valve disc having a relatively large mass. The construction is such that when the shock movement acts on the plunger during the movement of the operative part of the machine, the valve disc will remain relatively stationary with respect to the mounting of the machine so that the seat will move away from the disc and open the passageway to permit the displacement of the fluid and the absorption of the shock. The valve disc and the valve seat can be interchanged in their relative arrangement. With the arrangement of the invention, the drain valve disc will be acted upon such that it will move away from its associated valve seat so that the opening of the drain passageway will not be delayed by the mass moment of inertia and no undue pressure peak will be formed in the shock absorber. The drain valve opens in a relatively short time when a workpiece breaks and without destroying the machine parts transmitting the brake pressure.

Accordingly, it is an object of the invention to provide an improved shock absorber construction which includes a drain valve comprising a valve member of relatively great mass which is biased onto a seat formed at the end of a fluid drain passage of the shock absorber and wherein the inertia mass of the valve is relatively great so that it will have a tendency to move away from the valve seat whenever the shock absorber is subjected to an impact shock which would cause rapid relative movement between the passage with the valve seat and the valve.

A further object of the invention is to provide a hydraulic press which includes a crosshead supported on plungers which ride in a fluid pressure cylinder, the fluid pressure cylinder bleeding at one end through a throttle valve to an outlet and having a drain valve for the further expulsion of fluid when the crosshead is subjected to a shock movement, the drain passage having valve means therein with a moving part having an inertia mass such that it will move away from a valve seat which it closes to permit displacement of the fluid in the fluid pressure cylinder.

A further object of the invention is to provide a shock absorber drain valve system which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a schematic side elevational view of a hydraulic press having a shock absorber ring valve circuit constructed in accordance with the invention; and FIG. 2 is an enlarged section through the shock absorber valve housing indicated in FIG. 1.

GENERAL DESCRIPTION OF THE PREFERRED EMBODIMENT

Referring to the drawings, in particular, the invention embodied therein comprises a hydraulic press generally designated 20 having a frame 22 which supports a hydraulic cylinder 8. The cylinder 8 carries a plunger or ram 24 which connects to a crosshead 1 which extends outwardly from each side of the frame 22. Return cylinders 4, 4 are mounted on brackets 26, 26, respectively, and carry piston rod members or plungers 3 which are movable within the cylinders 4 and which include upper parts connected to the outer ends of the crosshead 1. The crosshead 1 is moved in a slow downward movement to deform a workpiece (not shown) which is arranged between tools 2, 2 carried on the crosshead 1 and the frame 22 respectively.

The two return plungers 3 displace the working fluid from the return cylinders 4, and they act as brake cylinders. The working fluid is directed through return lines 5 and a throttle 6 into a tank 7. Control valve means 28 may be provided for selectively directing of the fluid from the lines 5 to one or more locations. The throttle 6 is adjusted so that the working fluid does not undergo any substantially pressure increase above zero at the customary low-operating speed of the crosshead 1.

In accordance with the invention, a drain passage or pressure overload passage 12 is defined in the interior of the plunger 3 and the upper end connects into a valve housing generally designated 30 of a drain valve which includes a valve member or disc 10, which closes a valve seat 9 at the upper end of the passage 12. A spring 11 confined between a top plug 32 and the valve disc 10 biases the disc 10 against the seat 9 in a closed position. When the valve 10 moves away from the seat 9 communication between the passage 12 and a runoff line or outlet 13 is effected.

The closing force of the spring 11 is so selected in each drain valve 30 that each valve disc 10 will be pressed against the valve seat 9 during the operation of the press at the usual low-operating speed and maintained in a closed position during the normal-operating pressures which result. When the resistance of the workpiece against the tools 2, 2 ceases, because of a rupture for example, the compression energy stored in the fluid volume of the working cylinder 8 will drive the crosshead 1 downwardly rapidly. The relaxation of the press stand and of all the other force-transmitting parts of the machine have in the same sense an accelerating effect on the crosshead 1. The return plungers 3 are likewise accelerated downwardly with the crosshead and with them valve seats 9 of the drain lines 12. Because the valve disc 10 is made with a relatively large mass it will not follow the movement of the valve seat 9 downwardly even though the spring 11 is acting thereon but will move away from the seat to open the drain 12 and permit the fluid to move outwardly through the valve housing 30 and the outlet 13. Thus the danger that inadmissible high-pressure peaks will be formed in the shock chamber or the return cylinder 4 is avoided.

Subsequently the spring force of the adjustable closing spring 11 becomes effective and limits the pressure in the shock chamber and hence the outlet velocity of the working fluid through the drain valve. The setting of the spring may be adjusted by rotating the plug 32 which is threaded into the housing 30. The shock path can thus be preselected to an admissible shock pressure.

What is claimed is:

1. A drain valve for a hydraulic shock absorber comprising housing means defining a drain passage with a valve seat adjacent the end of said passage and an outlet opening, a valve disc positioned on said valve seat, means for biasing said disc onto said valve seat, said valve disc having a relatively large mass, means for connecting said housing means to a movable part of a machine which is subjected to rapid shock movement for movement of said housing means with said part during such shock movement, said valve disc being of a mass such that it will not move with the valve seat but will move away immediately upon acceleration thereof during shock movement to open the drain valve and communicate it with said outlet.

2. A drain valve construction, according to claim 1, wherein said housing means comprises a return plunger, a fluid cylinder surrounding said plunger, said plunger having a portion movable in said cylinder to displace a fluid outwardly from said cylinder during the movement of the machine part.

3. A drain valve for a hydraulic shock absorber comprising housing means defining a drain passage with a valve seat adjacent the end of said passage and an outlet opening, a valve disc positioned on said valve seat, means for biasing said disc onto said valve seat, said valve disc having a relatively large mass, means for connecting said housing means to a movable part of a machine which is subjected to rapid shock movement for movement of said housing means with said part during such shock movement, said valve disc being of a mass such that it will not move with the valve seat but will move away therefrom during shock movement to open the drain valve and communicate it with said outlet, a fluid guide cylinder, said housing means comprising a plunger having a portion movable in said fluid guide cylinder and adapted to displace a fluid by movement of said plunger, a crosshead of a hydraulic press connected to said plunger, a press ram connected to said crosshead for moving said crosshead in an operative direction of movement to engage a workpiece, throttle means connected to said fluid guide cylinder for permitting the throttling and a discharge of fluid therefrom during movement of said plunger, said plunger having said drain passage which is connected at its inner end to the interior of said fluid cylinder.

4. A hydraulic press comprising a frame, a workpiece support carried by said frame, a crosshead movable relative to said workpiece support, fluid pressure operated ram means connected to said crosshead for moving said crosshead toward and away from said workpiece support, a fluid return cylinder located adjacent said crosshead, a plunger carried by said crosshead and having an end movable in said fluid cylinder, said plunger defining a drain passage therethrough for the flow of fluid from said cylinder, a drain valve connected at the end of said flow passage including a seat defined at the end of said flow passage and a valve disc closing said seat, means biasing said valve disc to close said seat during normal operation pressure of said crosshead, said valve disc being of a large mass such that it will not move upon shock movement of said crosshead with said plunger and said valve seat but will be moved relatively away from said valve seat by movement of said valve seat to open said drain passage.

5. A hydraulic press, according to claim 4, including a plurality of plungers connected to said crosshead each being associated with a fluid cylinder and each having a drain valve connected thereto.

6. A hydraulic press, according to claim 5, including drain lines connected to each of the fluid cylinders of each of said plungers, and throttle means connected to said drain lines.

7. A drain valve according to claim 1, wherein said housing means comprises a return plunger having said valve seat.

* * * * *